Sept. 2, 1958  J. TURNER  2,850,113
AIR FILTER
Filed July 11, 1955  2 Sheets-Sheet 1

Inventor
John Turner
by Wright, Brown, Quinby & May
Attys.

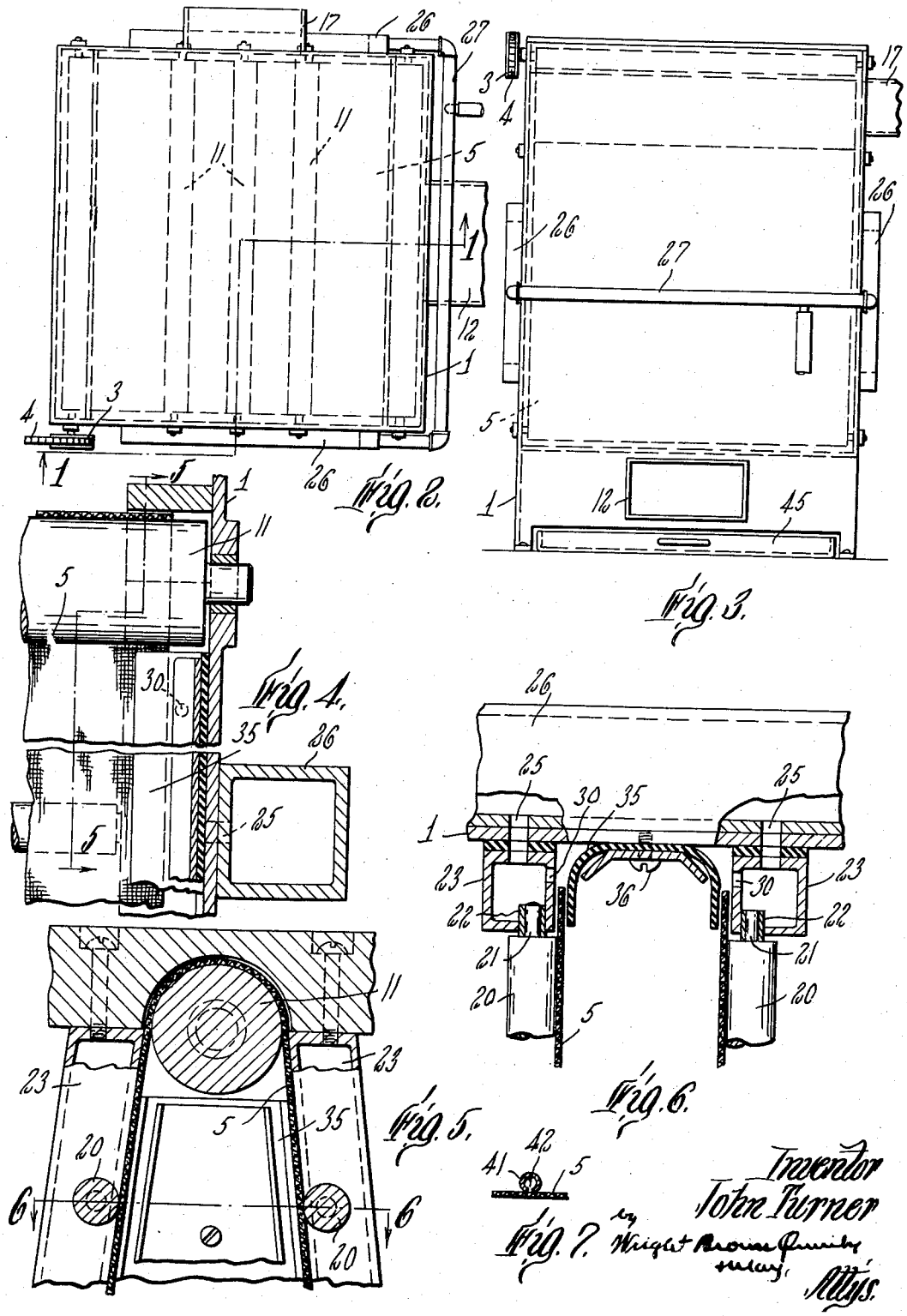

United States Patent Office 2,850,113
Patented Sept. 2, 1958

2,850,113

AIR FILTER

John Turner, Newton, Mass., assignor, by mesne assignments, to Koppers Company, Inc., Pittsburgh, Pa., a corporation of Delaware Application July 11, 1955, Serial No. 520,986

4 Claims. (Cl. 183—62)

This invention relates to air filters where the air to be filtered is under low pressure and in relatively large volume, and where very thorough filtration is desired, as, for example, in paint shops where the presence of even a small amount of dust may have serious effects on the paint finish.

In order to provide a large filter area or face without undue size of the filter, this invention provides for an endless belt filtering medium arranged in reverse bends or loop formation to expose large filtering faces or areas, and to move the belt lengthwise past a cleaning device which acts to remove filtered material therefrom.

With such an arrangement, means must be provided to seal off the side edges of the filtering belt from the escape of unfiltered air therearound, but such means must not impose undue drag on the filtering belt which would make its movement difficult.

In accordance with this invention, therefore, the belt-filtering element is supported on the clean gas outlet face on anti-friction rollers. In order to maintain these rollers free from dust collected from the air to be filtered, this invention further provides means for preventing access of non-filtered air thereto, and further to prevent leakage of unfiltered air about the margins of the filtering belt and at the same time to hold said margins out of dragging contact with the sealing means, a current of air in the opposite direction is employed to prevent such leakage and to float the margins out of contact with neighboring stationary parts.

For a more complete understanding of this invention, reference may be had to the accompanying drawings in which:

Figure 2 is a top plan view of the same.

Figure 3 is a right hand end elevation of the same.

Figure 4 is a detail sectional view to a larger scale on line 4—4 of Figure 1.

Figure 5 is a detail sectional view on line 5—5 of Figure 4.

Figure 6 is a detail sectional view on line 6—6 of Figure 5.

Figure 7 is a detail sectional view similar to a portion of Figure 1, showing a modification for cleaning the filtrate from the surface of the belt as it is being moved.

Figure 1:
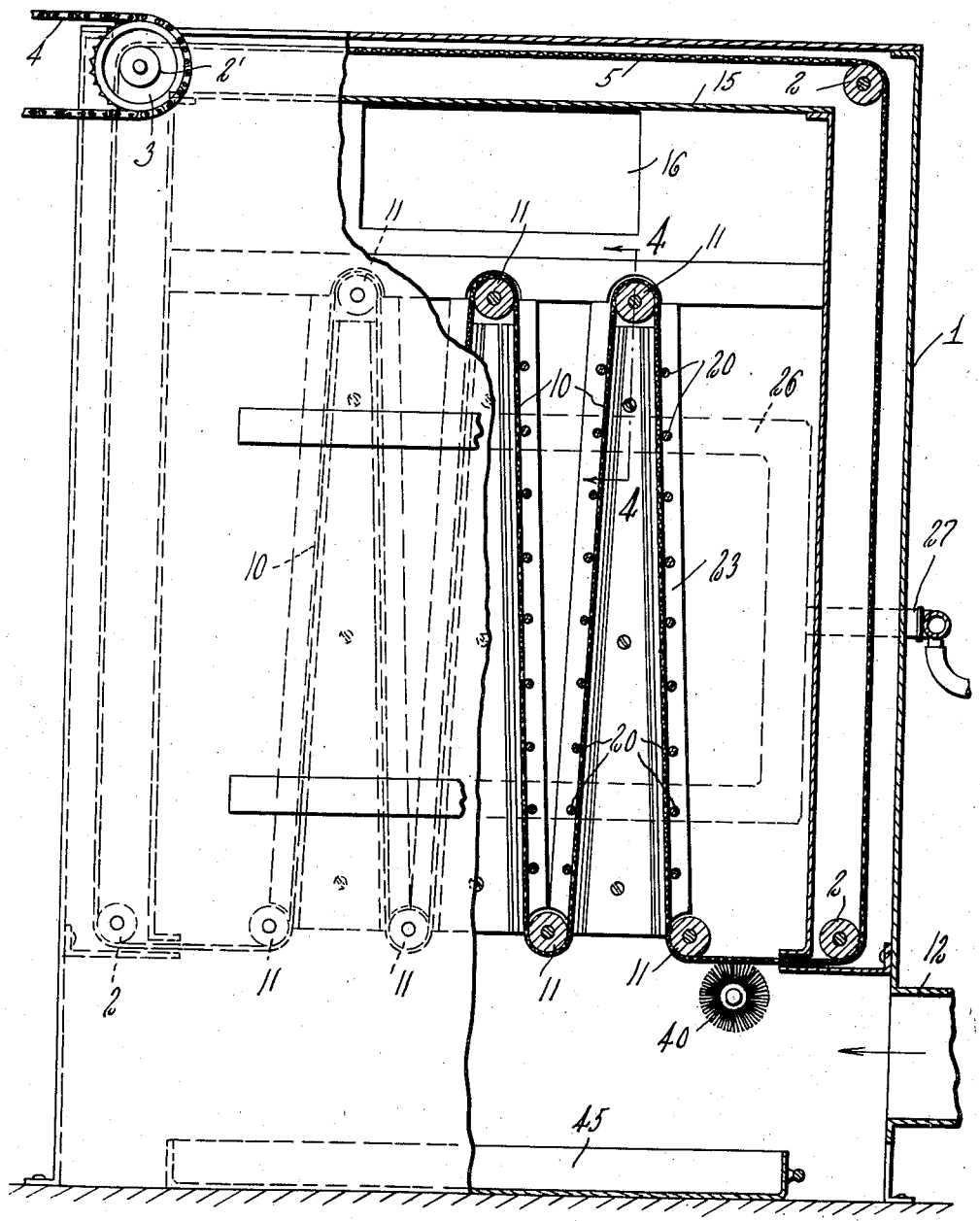
Figure 1 is a view partly in side elevation and partly broken away and in section on line 1—1 of Figure 2, of a filter embodying the invention.

Referring to the drawings, at 1 is indicated a casing within which are mounted adjacent to the upper corners thereof four bearing rollers 2 and 2'. One of these rollers, as at 2', is connected to means such as a sprocket wheel 3 over which passes a chain 4 by which this roller 2 may be rotated. Passing about these rollers, is an endless filtering element in the form of a belt 5 of suitable filtering material such as felt which is moved endwise by the rotation of the driven roller 2'. At an intermediate portion, the belt filtering element is arranged in a plurality of oppositely disposed loops 10 passing about suitably journaled rollers 11 so as to present a large filtering area or face to the unclean or dirty air to be filtered. This air to be filtered is introduced into the casing 1 through a conduit 12 as by a suitable fan (not shown), and the air which passes through the filtering element escapes therefrom into an inner casing 15 from which it may be removed through the opening 16. The air to be filtered thus comes into the bottom of the casing 1 and contacts with the adjacent inner or dirty air faces of the loops 10, the filtered air passing through the filtering belt and out from the inner casing 15 as through a duct 17.

In order to support the belt so that it may be moved without too great a drag, it is supported on the clean air face opposite to the air to be filtered on a series of rollers 20. As shown best in Figure 6, each of these rollers has a journal portion 21 journalled in a box 22, which extends into an elongated chamber or conduit 23. Air under pressure slightly greater than that of the air to be filtered, say, at 4" of water, while the air to be filtered is under pressure, say, at 2", is introduced into the conduit 23 through the openings 25 from a pressure pipe 26 within the inner casing 15 and connected to a source of pressure through a pipe 27 which extends out through the walls of the inner and outer casing.

The conduit 23 has openings 30 therethrough, as shown in Figure 6, positioned slightly beyond the outer edges of the filter belt 5 and through which air is discharged around the margins of the belt in an opposite direction to that which would be produced by the air to be filtered if this were at a high enough pressure. A flexible sealing member 35 fixed to the inside wall of the casing 15, as by screws 36, presents its margins overlapping the margins of the belt 5 as shown in Figure 6, and provides a substantially sealing engagement for these margins which permits a slight passage of air from the conduit 23 around the margins of the belt and the sealing member 35 into the air to be filtered, thus preventing any flow in the opposite direction which otherwise might occur due to the pressure of the air to be filtered. This arrangement causes the bearings 21 to rotate in clean air and produces a slight countercurrent of flow of this air around the margins of the filtering belt toward the air to be filtered floating these margins from dragging contact with the adjacent fixed conduits 23. This also prevents escape of air to be filtered in the opposite direction around the margins of the filtering belt. Thus the filtering belt is supported for a relatively free travel, and escape of air to be filtered around its margins is prevented.

Suitable means are provided for cleaning the filtrate from the surface of the belt as it is being moved. This means, as shown in Figure 1, may comprise a rotary brush 40 which contacts the face of the belt exposed to the air to be filtered. In place of such a brush, a slotted pressure pipe 41 (Figure 7) may be positioned on the opposite face of the belt and discharge air under pressure through a slot 42 facing the opposite side of the belt. This causes air current to pass through the filtering belt and to dislodge the filtrate therefrom. The filtrate may be collected in a pan 45 in the lower portion of the outer casing 1 as shown in Figure 1.

From the foregoing description of certain embodiments of this invention it will be evident to those skilled in the art that various changes and modifications may be made therein without departing from its spirit or scope.

I claim:

1. A gaseous fluid filtering apparatus comprising a casing having a dirty gas inlet and clean gas outlet, an endless sheet material filtering element adapted to travel endwise in said casing, said filtering element having a dirty gas face and an opposite clean gas face, rollers positioned to support said element on said clean gas face, bearings for the end portions of said rollers, journal boxes for said bearings adjacent to side edges of said filtering element, and means for subjecting said bearings within said boxes to clean gaseous fluid pressure conditions slightly higher than the pressure of said dirty gaseous fluid to be filtered thus maintaining said bearings clean and simultaneously discharging fluid under pressure away from said clean gas face and around said filtering element to float said filtering element for free travel and to prevent escape of fluid to be filtered around the margins of said filtering element.

2. In combination, a casing, an endless filtering element within said casing, said filtering element having a dirty gas face and an opposite clean gas face rollers journaled in said casing against which said clean gas face of said element is supported in a series of oppositely positioned elongated loops, a conduit along each margin of each of said loops, said rollers having bearings extending into said conduits, means for introducing gaseous fluid to be filtered into said casing for contact with said dirty gas face of said element in said loops, means for delivering filtered gaseous fluid from said clean gas face of said element and out from said casing, and means for introducing gaseous fluid under pressure higher than that of said gaseous fluid to be filtered into the interior of said conduits and into contact with said bearings.

3. In combination, a casing, an endless filtering element within said casing, said filtering element having a dirty gas face and an opposite clean gas face rollers journaled in said casing against which said clean gas face of said element is supported in a series of oppositely positioned elongated loops, a conduit along each margin of each of said loops, said rollers having bearings extending into said conduits, means for introducing gaseous fluid to be filtered into said casing for contact with said dirty gas face of said element in said loops, means for delivering filtered gaseous fluid from said clean gas face of said element and out from said casing, and means for introducing gaseous fluid under pressure higher than that of said gaseous fluid to be filtered into the interior of said conduits and into contact with said bearings, said conduit having openings adjacent to the margins of said element for the escape of such gaseous fluid around said margins and into the air to be filtered.

4. In combination, an endless sheet material filtering element said filtering element having a dirty gas face and an opposite clean gas face, a casing for said element, rollers supporting said clean gas face of said filtering element for motion lengthwise and having supporting bearings inwardly from opposite edges of said element, elongated chambers into which said bearings on each side of said element extend, the margins of said element overlying a portion of said chambers, a flexible element overlying margins of said filtering element on the opposite side from said chambers, means for introducing gaseous fluid to be filtered into contact with said dirty gas face of said filtering element, means for introducing gaseous fluid at a higher pressure than said gaseous fluid to be filtered into said chambers, said chambers having outlets beyond the margins of said filtering element for conducting gaseous fluid under such higher pressure to escape between said margins and flexible element into said gaseous fluid to be filtered.

References Cited in the file of this patent

UNITED STATES PATENTS

| | | |
|---|---|---|
| 394,408 | Simon | Dec. 11, 1888 |
| 1,862,839 | Brelsford et al. | June 14, 1932 |
| 1,949,002 | Annis | Feb. 27, 1934 |
| 2,244,165 | MacFarland et al. | June 3, 1941 |
| 2,709,500 | Carter | May 31, 1955 |
| 2,752,003 | Hersey et al. | June 26, 1956 |

UNITED STATES PATENT OFFICE
CERTIFICATE OF CORRECTION

Patent No. 2,850,113 September 2, 1958

John Turner

It is hereby certified that error appears in the printed specification of the above numbered patent requiring correction and that the said Letters Patent should read as corrected below.

Column 4, line 8, for "air" read -- gaseous fluid --.

Signed and sealed this 9th day of December 1958.

(SEAL)
Attest:

KARL H. AXLINE
Attesting Officer

ROBERT C. WATSON
Commissioner of Patents